United States Patent
Silverstein et al.

(10) Patent No.: US 11,308,667 B1
(45) Date of Patent: Apr. 19, 2022

(54) CHART ERRATUM AND REFACTORING

(71) Applicant: International Business Machines Corporation, Armonk, NY (US)

(72) Inventors: Zachary A. Silverstein, Jacksonville, FL (US); Trudy L. Hewitt, Cary, NC (US); Saswati Dana, Bangalore (IN); Mayoore Selvarasa Jaiswal, Austin, TX (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 17/120,360

(22) Filed: Dec. 14, 2020

(51) Int. Cl.
*G06T 11/20* (2006.01)
*G06V 30/422* (2022.01)
*G06F 16/901* (2019.01)

(52) U.S. Cl.
CPC .......... *G06T 11/206* (2013.01); *G06V 30/422* (2022.01); *G06F 16/9024* (2019.01)

(58) Field of Classification Search
CPC .. G06T 11/206; G06V 30/422; G06F 16/9024
See application file for complete search history.

(56) References Cited

U.S. PATENT DOCUMENTS

| | | | |
|---|---|---|---|
| 6,804,682 B1 | 10/2004 | Kemper |
| 7,856,626 B2 | 12/2010 | Abernethy, Jr. |
| 8,024,237 B1 | 9/2011 | Davidson |
| 8,499,280 B2 | 7/2013 | Davies |
| 8,516,111 B2 | 8/2013 | Cragun |
| 9,213,554 B2 | 12/2015 | Kumar |
| 9,262,850 B2 | 2/2016 | Yang |
| 9,740,480 B1 | 8/2017 | Ghouti |
| 10,002,449 B2 | 6/2018 | Monnier |
| 10,019,494 B2 | 7/2018 | Fan |
| 10,304,225 B2 | 5/2019 | Allyn |
| 10,354,419 B2 | 7/2019 | Ritchie |
| 2015/0049951 A1 | 2/2015 | Chaturvedi |
| 2016/0027193 A1 | 1/2016 | Schiffer |
| 2016/0307344 A1 | 10/2016 | Monnier |

(Continued)

FOREIGN PATENT DOCUMENTS

| | | | |
|---|---|---|---|
| EP | 2175387 A1 | 4/2010 |
| EP | 3014471 A1 | 5/2016 |

OTHER PUBLICATIONS

Wioleta Szwoch, Recognition, Understanding and Aestheticization of Freehand Drawing Flowcharts, 2007, IEEE, In Ninth International Conference on Document Analysis and Recognition (ICDAR2007), vol. 2, pp. 1138-1142, IEEE, 2007. (Year: 2007).*

(Continued)

*Primary Examiner* — Jeffery A Brier
(74) *Attorney, Agent, or Firm* — Gavin Giraud

(57) ABSTRACT

A computer-implemented method is provided. The embodiments include evaluating, by one or more processors, a specimen chart relative to a chart erratum model that has features mapped to an optimum state for a first chart type. The method also includes generating a first risk score for a first sample feature of the specimen chart. The first risk score may include a delta from the optimum state. The method also includes refactoring the specimen chart to mitigate the first risk score of the first sample feature.

20 Claims, 6 Drawing Sheets

(56) References Cited

U.S. PATENT DOCUMENTS

2017/0185835 A1 6/2017 Appel
2020/0019549 A1 1/2020 Agnew

OTHER PUBLICATIONS

Balaji et al., "Chart-Text: A Fully Automated Chart Image Descriptor", arXiv:1812.10636v1, [cs.CV], Dec. 27, 2018, 12 Pages.
Glen, Stephanie, "Misleading Graphs: Real Life Examples", Statistics How To, Jan. 24, 2014, 6 Pages.
Jnagal, Amit, "How Can I Use Computer Vision to Read Charts?", Infrrd Inc., Infrrd Blogs, May 12, 2017, 3 Pages.
Peng, Neo Yi, "Reading Stock Charts with Convolutional Neural Networks", Medium, Towards Data Science, Jun. 3, 2019, 5 Pages.
Saket et al., "Beyond Heuristics: Learning Visualization Design", arXiv:1807.06641v2, [cs.HC], Aug. 15, 2018, 4 Pages.

* cited by examiner

CHART ERRATUM AND REFACTORING

BACKGROUND

The present invention relates generally to the field of data representation, and more particularly to visual charts that are organized with potentially misleading design characteristics.

The amount of data that is collected and presented in society has been increasing for many years, and this trend looks likely to continue. Since the speed of decision making is also increasing there is a need to communicate this amount of data in a visual way. When produced effectively, charts and graphs condense data so that meaningful conclusions can be shared quickly and efficiently.

SUMMARY

According to one embodiment of the present invention, a computer-implemented method, a computer program product, and a computer system are provided. The embodiments include evaluating, by one or more processors, a specimen chart relative to a chart erratum model that has features mapped to an optimum state for a first chart type. The method also includes generating a first risk score for a first sample feature of the specimen chart. The first risk score may include a delta from the optimum state. The method also includes refactoring the specimen chart to mitigate the first risk score of the first sample feature.

DETAILED DESCRIPTION

With an increase in visual conveyance of information, the potential for misleading or misinterpreted data also increases. Some charts, for one reason or another, can be difficult to interpret, lead a viewer to draw a faulty conclusion, or obscure the information due to design choices in the presentation of the data. Embodiments of the present invention, therefore, include an environment and method for deriving a chart erratum model for particular types of charts such that characteristics of that type of chart can be optimally readable and understandable. The model may be used to refactor charts subsequently evaluated through the chart erratum model so that the charts are closer to the optimal state for the chart type.

Figure 1:
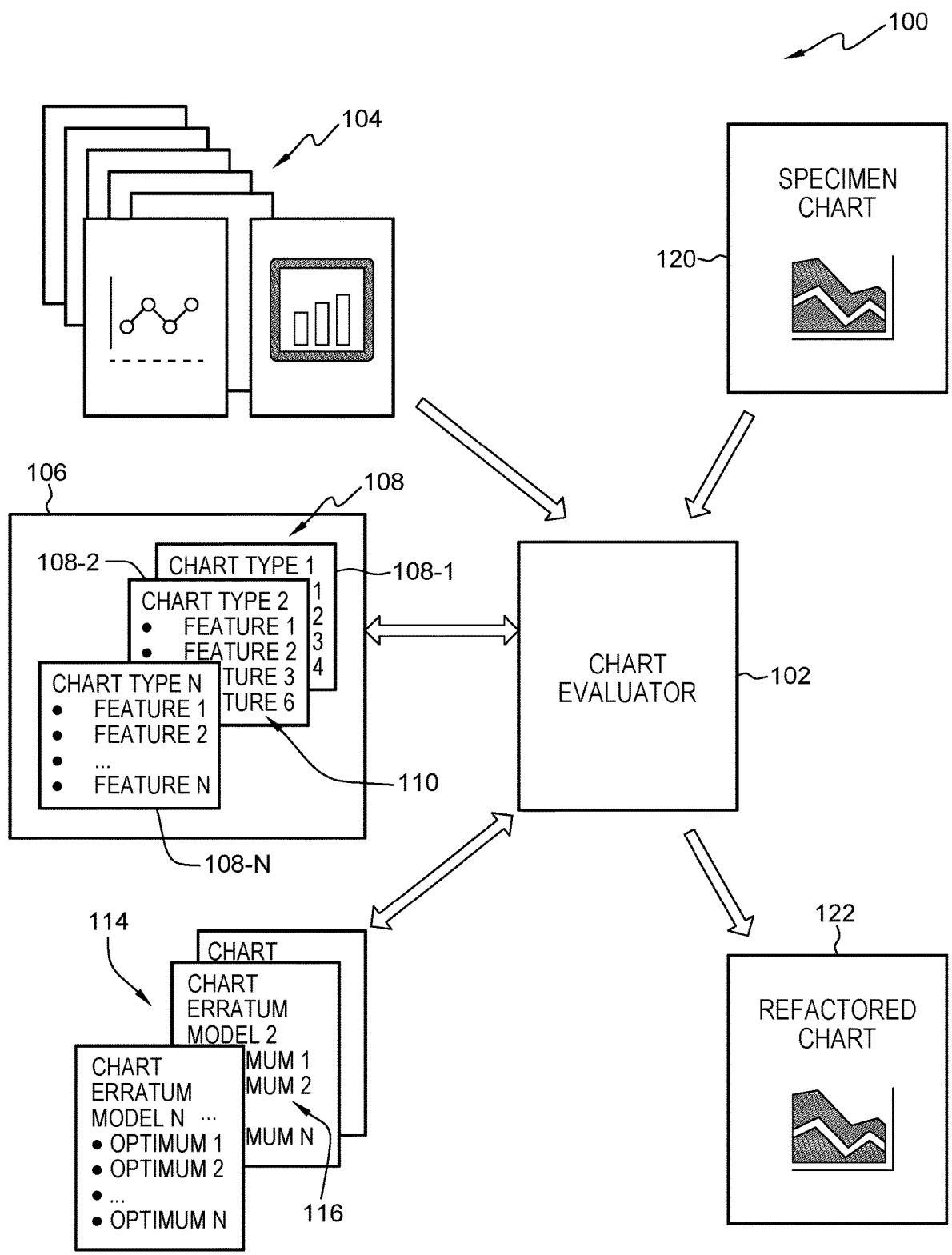
FIG. 1 is a functional block diagram illustrating a chart evaluator environment, in accordance with an embodiment of the present invention.

The present invention will now be described in detail with reference to the Figures. FIG. 1 is a functional block diagram illustrating a chart evaluation environment 100, in accordance with one embodiment of the present invention. The environment 100 includes a chart evaluator 102 that may be embodied as a computer, database, server or other device with computer readable storage media, or may be embodied as a program on such a device running instructions for executing the method described in FIG. 2. Specifically, the chart evaluator 102 may include a convolutional neural network or a support-vector machine. The environment 100 includes a plurality of charts 104. The charts 104 may come from any variety of sources and may be incorporated into the environment 100 through a network connection or local upload. The charts 104 may be sourced from news articles, websites, textbooks, marketing materials, or other sources. The charts 104 are fed into the chart evaluator 102 (e.g., over a network connection or internally from storage and/or memory), with indications for "good" or "bad" for each of the charts 104. Indications for the charts 104 are typically categorized by human users for the initial upload to the chart evaluator 102. The charts 104 may be categorized as good based, for example, on an overall level of understandability, readability, or legibility with a categorization of bad having a similar level of mis-understandability, unreadability, or illegibility. The good charts may also be manually fed to the chart evaluator 102 on a more granular level, whereby specific features of the charts 104 are categorized as understandable/mis-understandable or truthful/misrepresentative. The chart evaluator 102 is not directly programmed with criteria for the charts 104, but instead analyzes the charts 104 and extracts a general pattern 106. The pattern 106, as analyzed by the chart evaluator 102, includes chart types 108 that associate a feature 110, or multiple features 110, with the chart type 108. For example, chart type one 108-1 may include Feature 1: 2-D axes, Feature 2: line graph, Feature 3: horizontal marking, and Feature 4: color text. Another chart type (e.g., chart type two 108-2) has a different combination of features 110, but may have some of the same features 110, or may include additional or alternative features 110.

The chart types 108 may be periodically updated with the addition of new charts 104 to the environment 100 as they are analyzed by the chart evaluator 102. Additional chart types 108 may be added or combined depending on whether the chart evaluator 102 analyzes additional features 110, or recognizes that features 110 should be combined or split. That is, additionally analyzed charts may include a different form of line for a line graph, for example, which the chart evaluator 102 analyzes as a different feature 110 (and an additional chart type 108). On the other hand, additionally analyzed charts may include a form of a line graph that is similar to two forms of line graphs that have been established as features 110. In such a case, the chart evaluator 102 may combine all three forms into one feature 110 and collapse two chart types 108 into one chart type 108.

The chart evaluator 102 also derives chart erratum models 114 based on the chart types 108. The chart erratum model 114 includes an optimum state 116 for each feature 110. The chart evaluator 102 maps the optimum state 116 as the state, appearance, form, shape, etc. of the feature 110 in which the data or information is the most consistent with the chart type, as determined through analysis of the charts 104. The chart erratum model 114 includes a scoring rubric for each optimum state 116 that is defined as a delta from the optimum state 116. The delta may be a percentage difference from the optimum state 116, or may include a "yes" or "no" value to score whether a feature will be misleading or difficult to understand. The chart evaluator 102 evaluates a specimen chart 120 relative to a chart erratum model 114 and generates a refactored chart 122 that has one or more features that is highlighted, changed, or otherwise refactored relative to the specimen chart 120.

Figure 2:
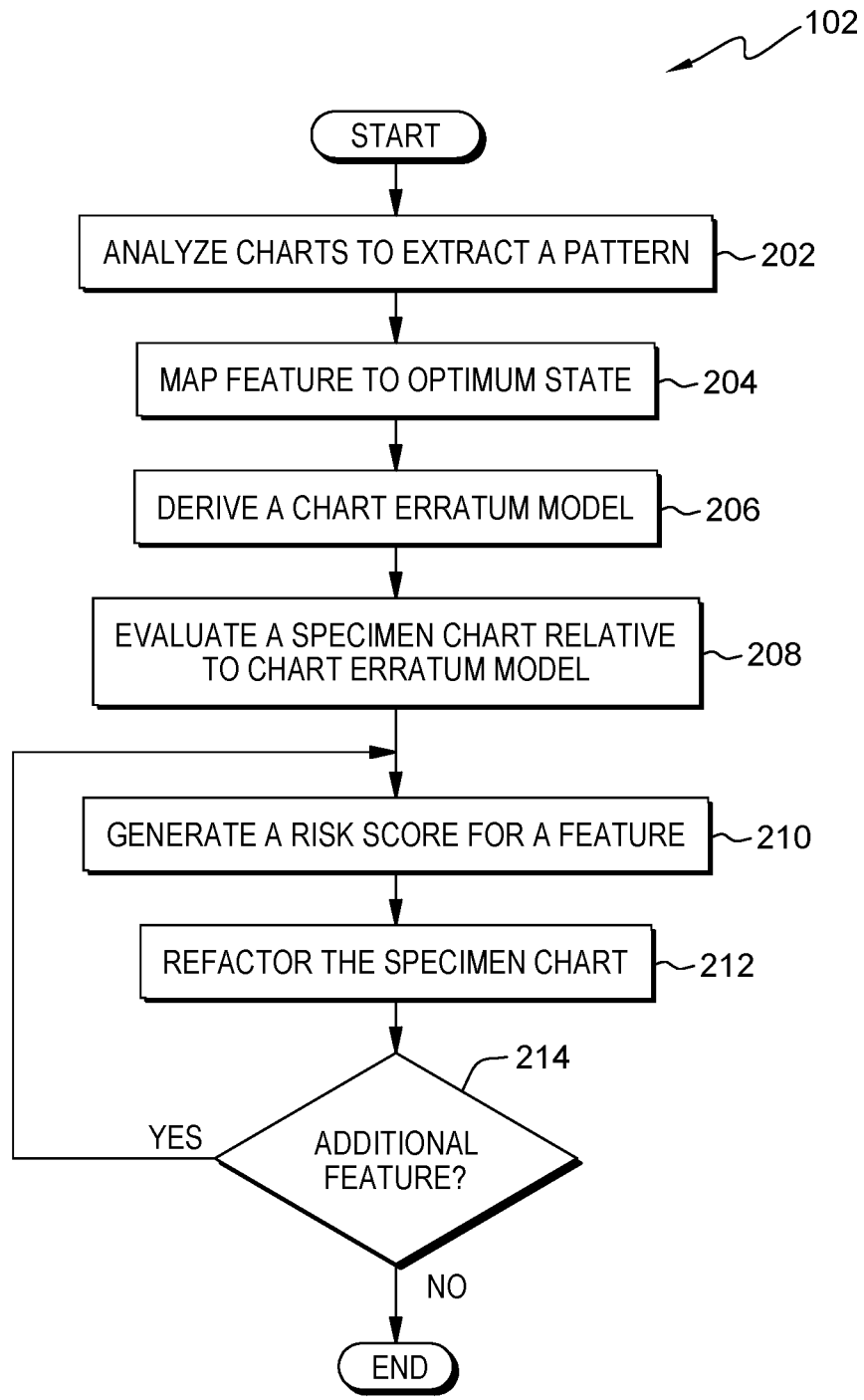
FIG. 2 is a flowchart depicting operational steps of a chart evaluator program, in accordance with an embodiment of the present invention.

FIG. 2 is a flowchart depicting operational steps of the chart evaluator 102 program of FIG. 1, in accordance with an embodiment of the present invention. The method begins with the chart evaluator 102 analyzing charts 104 to extract a pattern 106 (block 202). As described above, the pattern 106 includes chart types 108 defined by features 110 extracted by the chart evaluator 102 during the analysis. The chart types 108 may include, for example, a bar chart, a line graph, a table, or a pie chart, or may include combinations of these. The chart evaluator 102 is not limited to chart types 108 that have been defined previously but may organize the chart types 108 with features that a human viewer may recognize as typical for a familiar chart.

The chart evaluator 102 also maps the features to an optimum state 116 (block 204). The optimum state 116 is mapped to the value, characteristic, design, etc. that minimizes misunderstanding. The chart evaluator 102 determines "misunderstanding" based on machine-learning. For example, the optimum state 116 is mapped so that the context of the messaging in the charts 104 matches the context of the graph. The optimum state 116 may be derived from Boolean indicators such as "Image embedded within graphic?" (Y/N), "Text overlaid on graph?" (Y/N) or "Equal intervals on X axis?" (Y/N). Features having Boolean indicators as optimum states 116 result from the chart evaluator 102 determining that charts 104 of a certain type 108 include this feature 110 in a majority of the charts 104 of that type 108. Furthermore, the optimum state may include non-Boolean indicators such as degree of similarity between colors used (e.g., dark grey color scheme for a first bar in a bar graph and medium grey color scheme for a second bar in the bar graph). The differences between colors may be determined, for example, using the MacAdam diagram. That is, if sections in a bar graph, pie chart, or other chart are closer than a threshold (e.g., 0.15 units on the MacAdam diagram), then the sections will be flagged as not in the optimum state 116.

The optimum state 116 may be mapped so that the correct perspective and context is being demonstrated, or that data points in the chart 104 do not insinuate cause and effect without proof. The chart evaluator 102 may formulate the optimum state 116 based on a consensus configuration of the feature 110. Additionally or alternatively, the chart evaluator 102 may map the optimum state 116 based on user feedback. A user or reviewer may also adjust the optimum state 116 in conjunction with the mapping of each feature 110.

The chart evaluator 102 then derives a chart erratum model 114 based on the optimum states 116 (block 206). The chart erratum model 114 includes an optimum state 116 for each of the features 110 in the chart type 108. The chart erratum model 114 also includes a scoring rubric defined by a delta from the optimum state 116. The scoring rubric enables the chart evaluator 102 to a quantitative value for deviations from the optimum state 116. The chart evaluator 102 then evaluates the specimen chart 120 relative to the chart erratum model 114 (block 208). In certain embodiments, the chart evaluator 102 may begin the method with a chart erratum model 114 already derived. The evaluation may include extracting the features 110 in the specimen chart 120 and comparing the features to potential chart types 108 stored in the pattern 106. The chart evaluator 102 includes, in the evaluation, a selection of the chart type 108 that is closest to the specimen chart 120.

The chart evaluator 102 then generates a risk score for a first feature 110 in the specimen chart 120 (block 210). The risk score may be a percentage, a grade, or another indication of the likelihood of misinterpretation. For example, a chart that has a patterned scheme that is different for different sections of the chart may be difficult for a person to read. The risk score for the pattern scheme feature, however, may be low since the necessity for focusing on the chart does not increase the danger of misunderstanding. A bar chart with an x-axis having different x-intervals, on the other hand, may be assigned a high risk score, since a uniform x-interval is expected and a different x-interval may be easily overlooked when viewing the bar chart. The specific value for how high the risk score would be is dynamically trained and set for each chart type. A close color on a bar chart may be 15% risk but a close color on a pie chart may be a 60% risk as the sections on a pie chart border one another and thus would not be distinguishable. Rather than a quantitative score for each feature 110, the risk score could also be determined by a categorical level for each feature. For example, if a feature 110 poses a data interpretation risk, it would be given 5 stars of risk, a feature 110 having missing relevant/important data would be given 3 stars of risk, etc.

The chart evaluator 102 also refactors the specimen chart 120 into the refactored chart 122 (block 212). The refactoring includes adding to or changing the appearance of the specimen chart to mitigate the feature 110 that received a risk score. For example, refactoring the specimen chart 120 may include highlighting a feature 110, labeling a feature 110 with a risk score, or changing the appearance of one or more of the features 110 to be more aligned with the optimum state 116. Examples of refactoring are included in the figures described below.

The risk score may be generated for additional features 110 (second, third, etc.) in the specimen chart 120 as well. The chart evaluator 102 cyclically checks for additional features in the specimen chart 120 and/or the refactored chart 122 until there are no additional features to refactor (block 214). As part of refactoring the specimen chart 120, the refactored chart 122 may also include an overall risk score. The overall risk score aggregates, averages, or otherwise computes the risk of the combination of features of the specimen chart 120 that are not aligned with the optimum state 116. The overall risk score may include a recommendation for whether or not to publish the specimen chart 120, or whether the likelihood of confusion is high and requires redrafting of the refactored chart.

Figure 3:
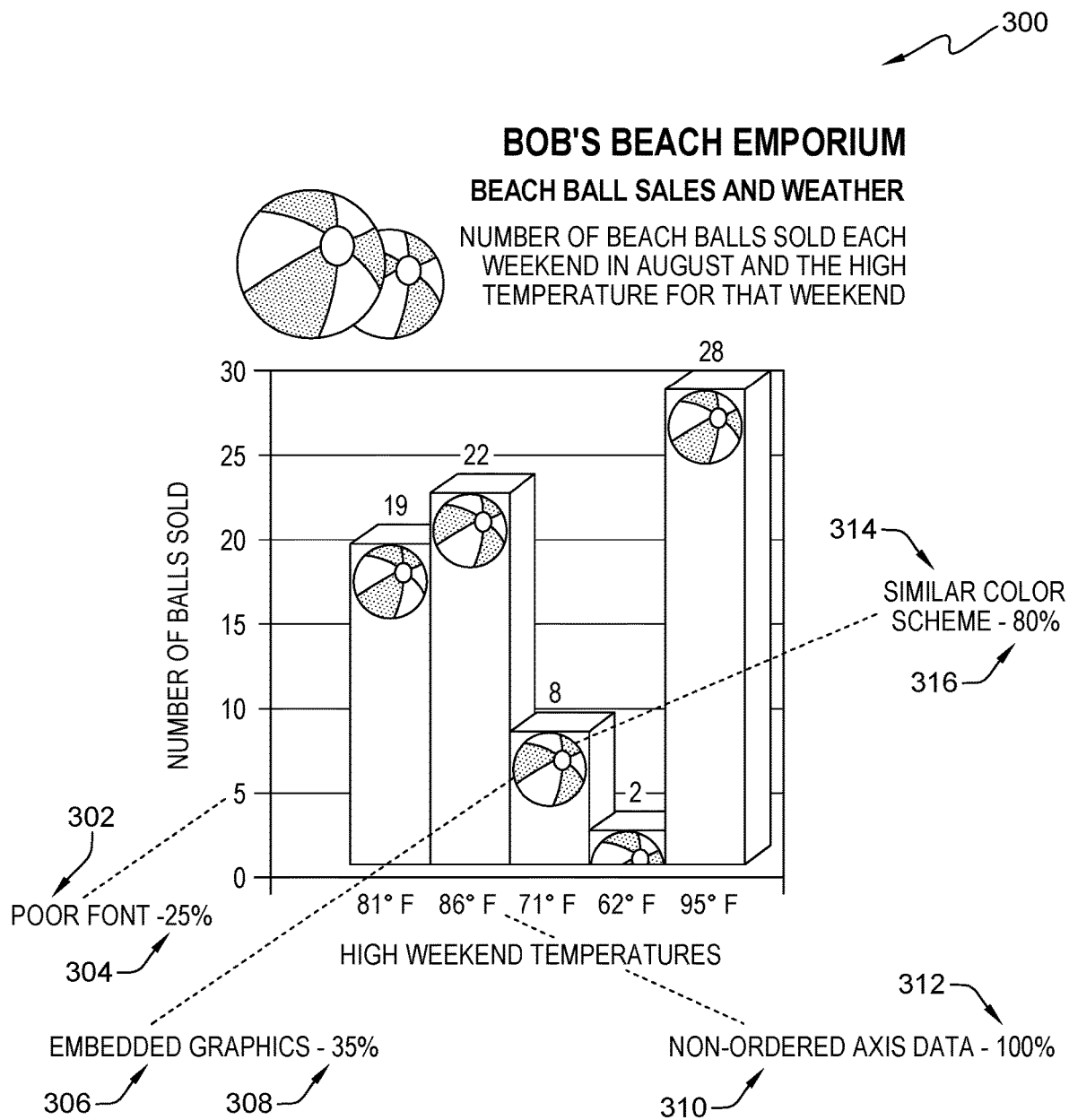
FIGS. 3-6 illustrate sample refactored charts that have been refactored by the chart evaluator of FIG. 1, in accordance with embodiments of the present invention.

FIG. 3 is an example of a refactored chart 300 that has been refactored by the chart evaluator 102 of FIG. 1, in accordance with an embodiment of the present invention. The refactored chart 300 includes a two-axis bar chart showing the "number of beach balls sold each weekend in August and the high temperature for the weekend." The chart evaluator 102 has gone through the method and generated a risk score for four features. A first refactoring indicator 302 indicates that there is a risk of misinterpretation due to a poor font. The first refactoring indicator 302 includes a first risk score 304 copied right into the refactored chart 300: 25 percent. Since the first risk score 304 is given as a percent, a reviewer of the refactored chart 300 can understand that a risk score closer to 100 would mean that the poor font is unreadable. This font, however, is not egregiously misaligned with the optimum state 116, and therefore has a lower risk score. A second refactoring indicator 306 indicates there is a risk of misinterpretation due to embedded graphics. For this chart type, at least, the chart erratum model maps the optimum state 116 as including no embedded graphics, or embedded graphics that have a different effect on the readability of chart of this chart type. A second risk score 308 is higher than the first risk score 304 (35 percent versus 25 percent) indicating that the embedded graphics have a higher potential to cause misinterpretation.

A third refactoring indicator 310 indicates that there is a risk of misinterpretation due to non-ordered axis data. This feature receives a third risk score 312 of 100 percent, meaning that in all cases of this chart type, the axis data organized this way carried a risk of misinterpretation. A fourth refactoring indicator 314 indicates that there is a risk of misinterpretation due to the refactored chart 300 having a similar color scheme. This feature receives a fourth risk score 316 of 80 percent, indicating that there is a high likelihood of misinterpretation. The risk indicators 302, 306, 310, 314 maintain the originality of the refactored chart 300 while indicating factors to improve readability and reduce complexity or ambiguity that can lead to confusion.

Figure 4:
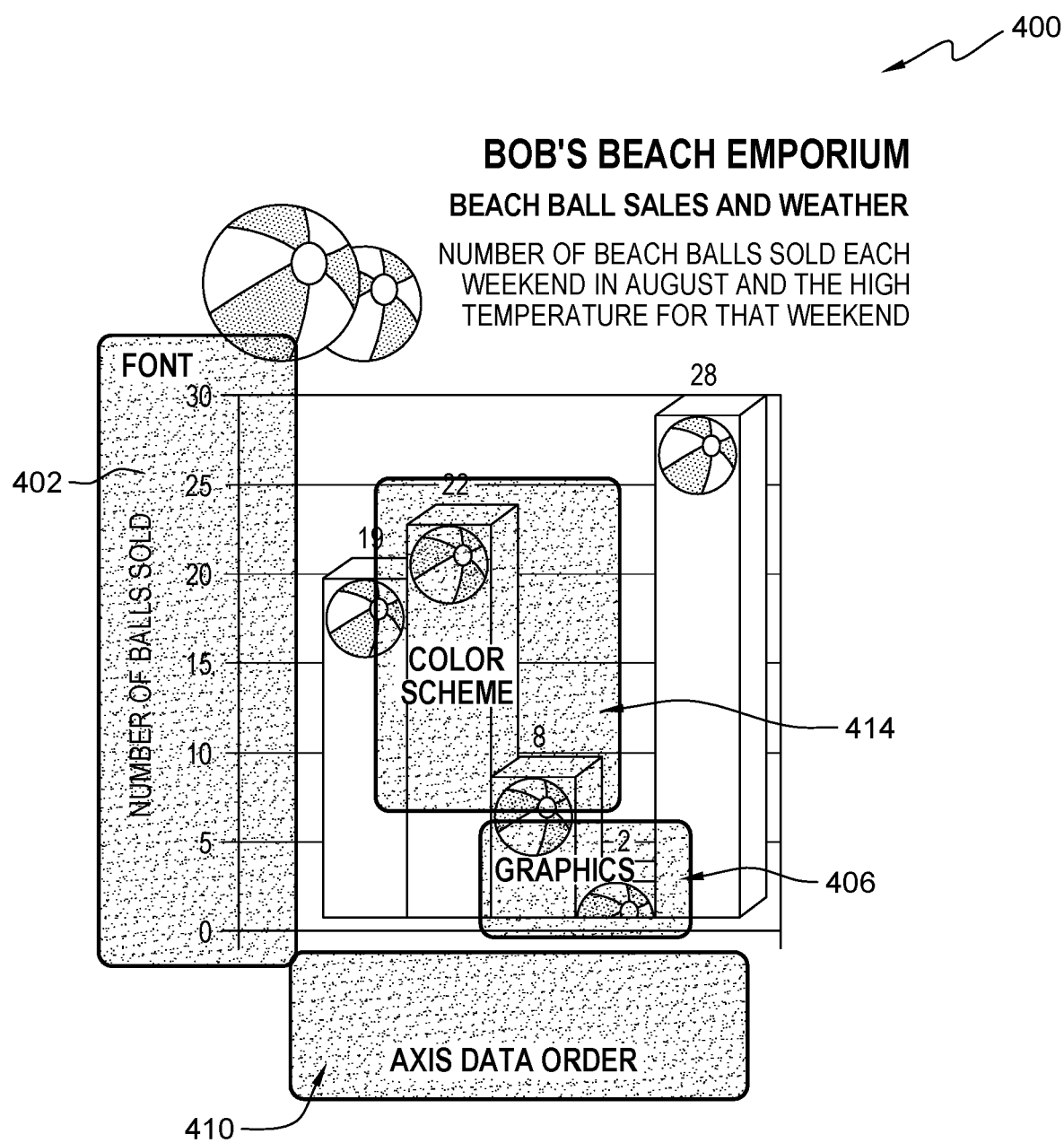

FIG. 4 is an example of a refactored chart 400 that has been refactored by the chart evaluator 102 of FIG. 1, in accordance with an embodiment of the present invention. The refactored chart 400 is refactored from the same specimen chart of the refactored chart 300 of FIG. 3, but the refactoring indicators in FIG. 4 are different. The differences may be predicated on a preference by a reviewer of the charts. For example, a reviewer preferring FIG. 4 prioritizes knowing which features are misleading, rather than knowing to what degree the features are misleading. A first refactoring indicator 402 still indicates that there is a risk of misinterpretation due to font, but in FIG. 4 the refactoring indicator 402 does not include a numerical risk score. The chart evaluator 102 generates a risk score, but the visual representation for the refactoring is a binary blanketing only for any feature with a risk score over a threshold. Thus in the illustrated embodiment of FIG. 4, a second refactoring indicator 406 indicates that there is a risk of misinterpretation due to graphics, a third refactoring indicator 410 indicates that there is a risk of misinterpretation due to axis data order, and a fourth refactoring indicator 414 indicates that there is a risk of misinterpretation due to color scheme, and draws attention to the specific areas of the refactored chart 400 that are effected.

In certain embodiments, the refactoring indicators 402, 406, 410, 414 may include a non-numerical indication of risk score. For example, a low risk score (e.g., 25 percent—first risk score 304 of FIG. 3) could be represented by a lighter highlight or a different color, while a high risk score (e.g., 100 percent—third risk score 312 of FIG. 3) could be represented by a darker highlight, or vice versa. That is, the first refactoring indicator 402 in FIG. 4 could be tinted a light pink while the third refactoring indicator 410 of FIG. 4 could be tinted deep red.

Figure 5:
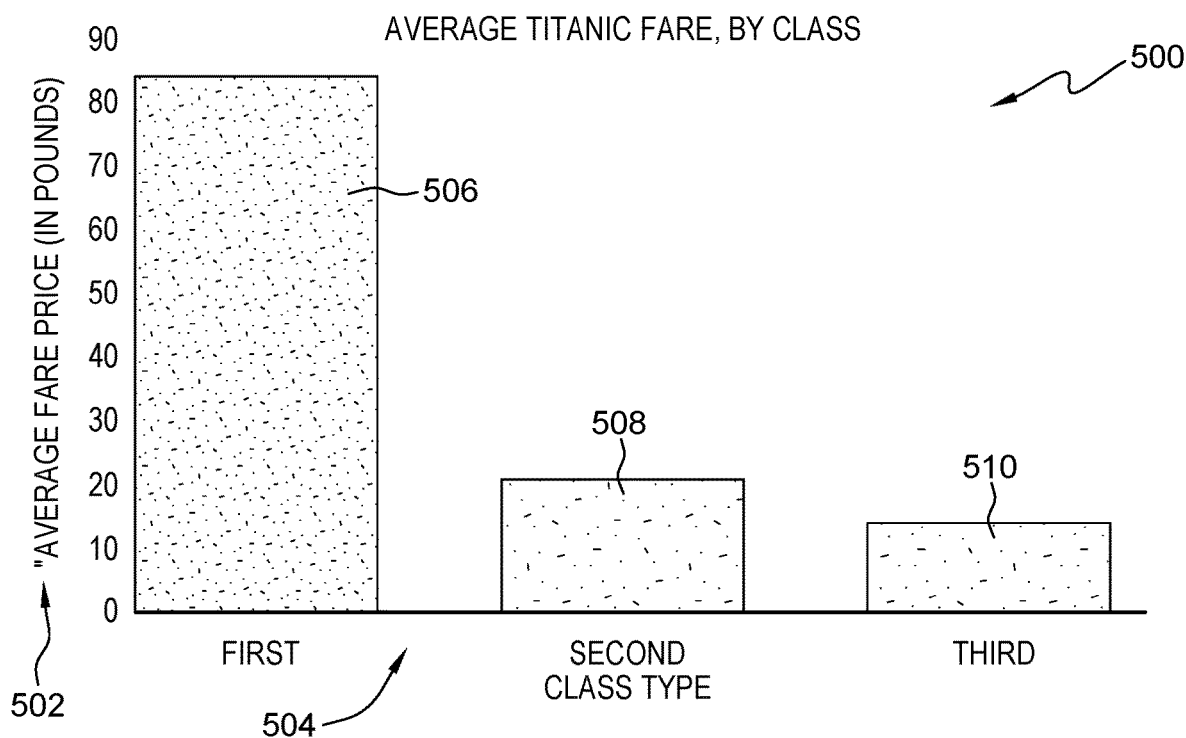
Figure 6:
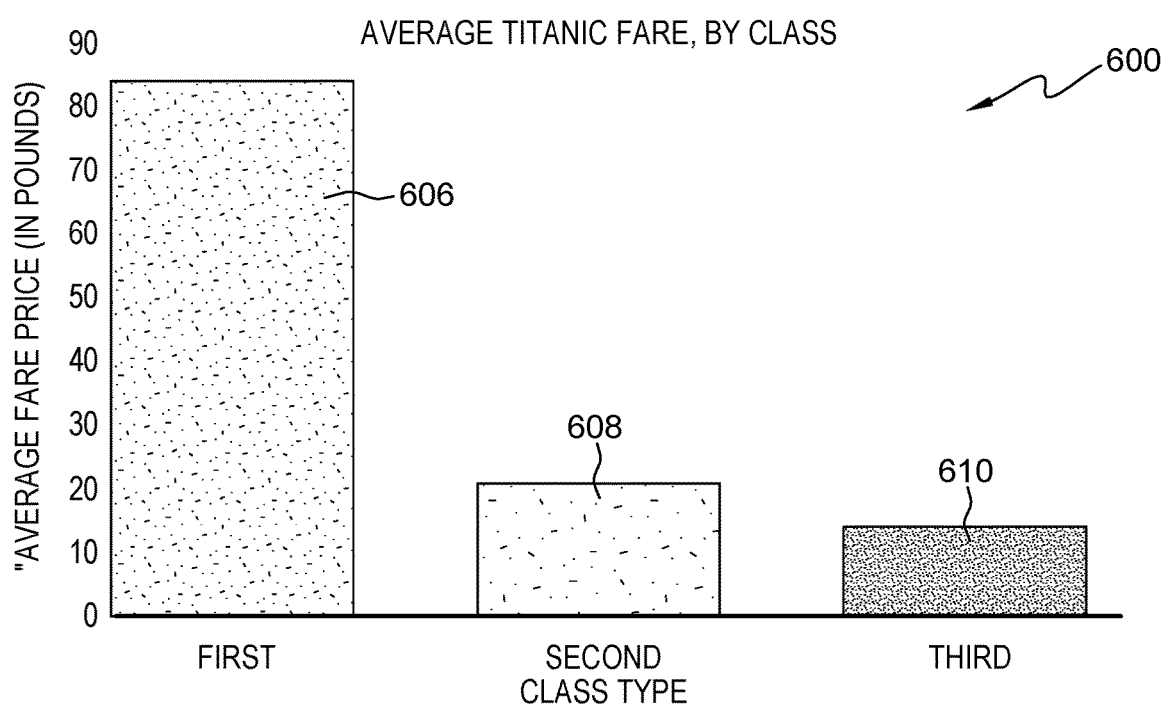

FIG. 5 is an example of a specimen chart 500 that has been submitted to be refactored by the chart evaluator 102 of FIG. 1, in accordance with an embodiment of the present invention. The specimen chart 500 is titled "Average Titanic Fare, by Class" and includes a two-axis bar chart having a first axis 502 designating the average fare price (in pounds) and a second axis 504 designating class type. The specimen chart 500 also includes a first bar 506 indicating the first class, a second bar 508 indicating the second class, and a third bar 510 indicating the third class. When the chart evaluator 102 evaluates the specimen chart 500 relative to the chart erratum model 114, the similar color between the second bar 508 and the third bar 510 may generate a risk score above a certain threshold. Therefore, as shown in FIG. 6, the chart evaluator 102 may refactor the specimen chart 500 into the refactored chart 600, without any indication that the specimen chart 500 has been changed. Specifically, the refactored chart 600 has the same color for a first bar 606 and a second bar 608. A third bar 610, however, in the refactored chart 600 includes a color scheme that has been refactored to be different than the second bar 608, and remain different from the first bar 606.

Figure 7:
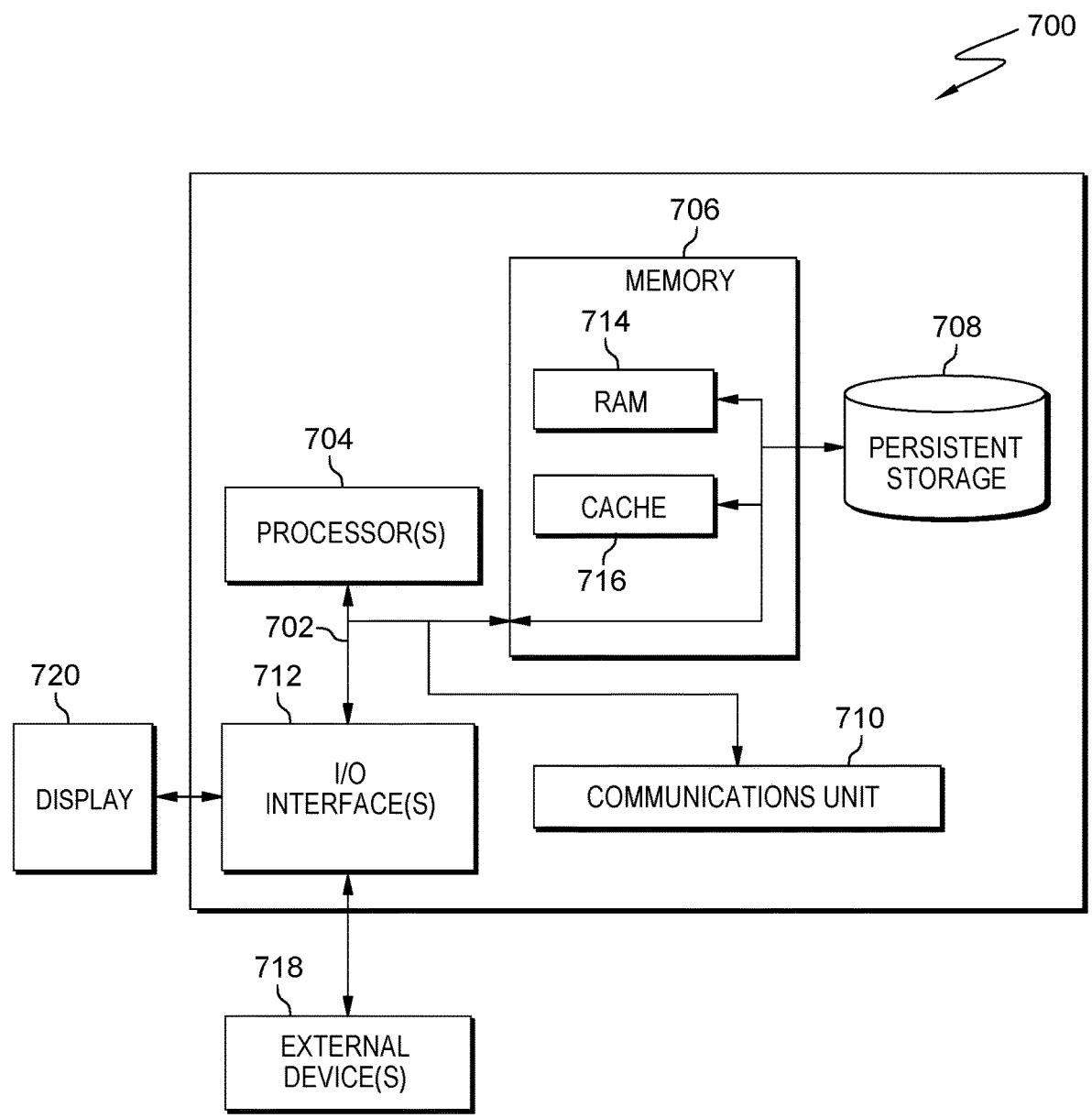
FIG. 7 is a block diagram of components of the computer executing the chart evaluator program, in accordance with an embodiment of the present invention.

FIG. 7 depicts a block diagram of components of the chart evaluation environment 100 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

The chart evaluation environment 100 includes communications fabric 702, which provides communications between RAM 714, cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

The chart evaluator 102 may be stored in persistent storage 708 and in memory 706 for execution and/or access by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. The chart evaluator 102 may be downloaded to persistent storage 708 through communications unit 710.

I/O interface(s) 712 allows for input and output of data with other devices that may be connected to server computer. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention (e.g., the chart evaluator 102) can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
    evaluating, by one or more processors, a specimen chart relative to a chart erratum model comprising features mapped to an optimum state for a first chart type;
    generating a first risk score for a first sample feature of the specimen chart, wherein the first risk score comprises a delta from the optimum state; and
    refactoring the specimen chart to mitigate the first risk score of the first sample feature.

2. The method of claim 1, comprising analyzing a plurality of charts to extract a pattern, wherein the pattern comprises a plurality of chart types defined by features.

3. The method of claim 2, comprising mapping the features to optimum states for each chart type.

4. The method of claim 2, wherein analyzing the plurality of charts comprises training a selection from the group consisting of a convolutional neural network and a support-vector machine.

5. The method of claim 1, wherein the first chart type is selected from the group consisting of a bar chart, a line graph, a table, and a pie chart.

6. The method of claim 1, wherein refactoring the specimen chart comprises labeling the first sample feature with a numerated risk score.

7. The method of claim 1, wherein refactoring the specimen chart comprises a selection from the group consisting of highlighting the first sample feature and changing an appearance of the first sample feature.

8. The method of claim 1, comprising:
    generating a second risk score for a second sample feature; and
    generating an overall risk score for the specimen chart based on the first risk score and the second risk score.

9. A computer program product comprising:
    one or more computer readable storage media, and program instructions collectively stored on the one or more computer readable storage media, the program instructions comprising:
        evaluating, by one or more processors, a specimen chart relative to a chart erratum model comprising features mapped to an optimum state for a first chart type;
        generating a first risk score for a first sample feature of the specimen chart, wherein the first risk score comprises a delta from the optimum state; and
        refactoring the specimen chart to mitigate the first risk score of the first sample feature.

10. The computer program product of claim 9, wherein the program instructions comprise analyzing a plurality of charts to extract a pattern, wherein the pattern comprises a plurality of chart types defined by features.

11. The computer program product of claim 10, wherein the program instructions comprise mapping the features to optimum states for each chart type.

12. The computer program product of claim 10, wherein analyzing the plurality of charts comprises training a selection from the group consisting of a convolutional neural network and a support-vector machine.

13. The computer program product of claim 9, wherein the first chart type is selected from the group consisting of a bar chart, a line graph, a table, and a pie chart.

14. The computer program product of claim 9, wherein refactoring the specimen chart comprises labeling the first sample feature with a numerated risk score.

15. The computer program product of claim 9, wherein refactoring the specimen chart comprises a selection from the group consisting of highlighting the first sample feature and changing an appearance of the first sample feature.

16. The computer program product of claim 9, wherein the program instructions comprise:
    generating a second risk score for a second sample feature; and
    generating an overall risk score for the specimen chart based on the first risk score and the second risk score.

17. A computer system comprising:
    one or more computer processors, one or more computer readable storage media, and program instructions collectively stored on the one or more computer readable storage media for execution by at least one of the one or more computer processors, the program instructions comprising:
        evaluating, by one or more processors, a specimen chart relative to a chart erratum model comprising features mapped to an optimum state for a first chart type;
        generating a first risk score for a first sample feature of the specimen chart, wherein the first risk score comprises a delta from the optimum state; and
        refactoring the specimen chart to mitigate the first risk score of the first sample feature.

18. The computer system of claim 17, wherein the program instructions comprise:
    analyzing a plurality of charts to extract a pattern, wherein the pattern comprises a plurality of chart types defined by features; and
    mapping the features to optimum states for each chart type.

19. The computer system of claim 17, wherein refactoring the specimen chart comprises a selection from the group consisting of labeling the first sample feature with a numerated risk score, highlighting the first sample feature, and changing an appearance of the first sample feature.

20. The computer system of claim 17, wherein the program instructions comprise:
    generating a second risk score for a second sample feature; and
    generating an overall risk score for the specimen chart based on the first risk score and the second risk score.

* * * * *